United States Patent [19]
Miyano

[11] Patent Number: 5,329,400
[45] Date of Patent: Jul. 12, 1994

[54] FOCAL LENGTH CHANGEABLE LENS

[75] Inventor: Hitoshi Miyano, Omiya, Japan

[73] Assignee: Fuji Photo Optical Co., Ltd., Saitame, Japan

[21] Appl. No.: 8,807

[22] Filed: Jan. 25, 1993

[30] Foreign Application Priority Data

Jan. 24, 1992 [JP] Japan .................. 4-011434

[51] Int. Cl.$^5$ ............................ G02B 15/04
[52] U.S. Cl. .................. 359/673; 359/674; 359/689
[58] Field of Search ............... 359/672, 673, 674, 689

[56] References Cited

U.S. PATENT DOCUMENTS

| | | | |
|---|---|---|---|
| 4,110,005 | 8/1978 | Bohm et al. | 359/673 |
| 4,157,211 | 6/1979 | Tanaka et al. | 359/674 |
| 4,715,692 | 12/1987 | Yamada et al. | 359/674 |
| 5,097,360 | 3/1992 | Fukami et al. | 359/674 |

FOREIGN PATENT DOCUMENTS

129217  5/1989  Japan .................. 359/673

Primary Examiner—Edward K. Look
Assistant Examiner—Michael S. Lee
Attorney, Agent, or Firm—Keck, Mahin & Cate

[57] ABSTRACT

A focal length changeable lens system for use with an on-chip micro-lens equipped solid-state imaging device, whose exit pupil is located at a long distance and whose focal length is changeable between a long focal length and a short focal length. The lens system includes a first positive power lens group, a second positive power lens group and a third positive power lens group arranged in order from the object end. The lens system further includes an aperture stop fixedly disposed between the first and second lens groups where the subject focal point of the third lens group is positioned. When the second lens group is out of the optical axis, the lens system provides a long focal length, and when the first lens group is out of the optical axis, the lens system provides a short focal length.

6 Claims, 5 Drawing Sheets

FOCAL LENGTH CHANGEABLE LENS

BACKGROUND OF THE INVENTION

1. Field of the Invention

This invention relates to a focal length changeable lens with its exit pupil located at a long distance for use with a solid-state imaging device equipped with on-chip micro-lenses, and, more particularly, to a positive power focal length changeable lens positioned in front of a solid-state imaging device equipped with on-chip micro-lenses so as to effectively intake light into respective solid-state imaging elements of the imaging device.

2. Description of Related Art

With demands for high image quality, it is a recent tendency to form still pictures with a large number of picture elements. According to such demands, still video cameras are equipped with solid-state imaging devices, each device being comprised of a considerably large number of solid-state imaging elements. As the number of solid-state imaging elements per imaging device increases, each single solid-state imaging element is minimized, being made smaller and smaller. In addition, since the practical photosensitive area available as a light sensing means is only a part of the entire surface of the solid-state imaging element, the solid-state imaging device, comprised of a large number of such solid-state imaging elements, has the disadvantage that the light detected thereby is lessened. For this reason, it has been proposed to locate micro-lenses, such as convex lenses, with each micro-lens having an effective aperture larger than the practical photosensitive area, one for every solid-state imaging element, in order to direct light to the practical photosensitive area of each solid-state imaging element, thereby increasing the photosensitivity of the solid-state imaging device.

A reference is made to FIG. 5 for the purpose of providing a brief background of an on-chip micro-lens equipped solid-state imaging device that will enhance an understanding of the operation of the focal length changeable lens system of the present invention. As shown in FIG. 5, a solid-state imaging device 100 includes an imaging element array 101 of a large number of solid-state imaging elements, and an on-chip micro-lens array 102, of the same number of micro lenses as the solid-state imaging elements, placed over the imaging element array 101. Specifically, the photosensitive areas of the solid-state imaging elements is practically defined by apertures 103 which are isolated from one another. Each aperture 103 is precisely covered by a micro-lens element 104, such as a convergent or convex lens. All of these micro-lenses 104 are integrally formed in a single plate of the on-chip micro-lens array 102. Light rays impinging upon the micro-lenses 104 within their aperture 105 are diverged within the respective apertures 103 and focused on the surfaces of the solid-state imaging array 101, so as to form an image with high brightness. This is highly contributive to the sensitiveness of the solid-state imaging device.

Meanwhile, a focal length changeable lens system which is changeable in focal length between two focal lengths, such as a relatively long focal length and a relatively short focal length, is typically comprised of, in order from the object side, a first lens group, a diaphragm or aperture and a second lens group. The objective lens system is effected by the first lens group and the aperture with the second lens group is removed out of the optical path for providing a long focal length. On the other hand, it is effected by the second lens group and the aperture with the first lens group removed out of the optical path for providing a short focal length. Since such a focal length changeable lens system has been designed for use with still video cameras with no on-chip micro-lens equipped solid-state imaging devices, it unavoidably has an exit pupil at a long distance due to design limitations of these still video cameras.

However, if such a focal length changeable lens system, which is not designed and adapted so as to suitably cooperate with still video cameras with the on-chip micro-lens equipped solid-state imaging devices described above, is used, angles of marginal light rays incident upon micro-lenses is large relative to the direction parallel to the optical axes of the micro-lenses. Consequently, the amount of light impinging on each area of the photosensitive area defined by the aperture 103 is greatly reduced with an accompanying decrease in sensitivity of the solid-state imaging device.

SUMMARY OF THE INVENTION

It is therefore an object of the present invention to provide a focal length changeable lens system with its exit pupil located at a long distance for use with an on-chip micro-lens equipped solid-state imaging device, the focal length of which is changeable between a long focal length and a short focal length and which operates to ensure that the respective solid-state imaging elements receive a sufficient or ample amount of light rays.

It is another object of the present invention is to provide a focal length changeable lens system with its exit pupil located at a long distance which enables an on-chip micro-lens equipped solid-state imaging device to work with high sensitivity.

The foregoing object of the present invention is accomplished by providing a focal length changeable lens system for use with an on-chip micro-lens equipped solid-state imaging device, whose exit pupil is located at a long distance and whose focal length is changeable between a long focal length and a short focal length. The lens system includes a first lens group having a positive power, a second lens group having a positive power and a third lens group having a positive power arranged in order from the object end to the image end. Both first lens group and second lens group are movable into and out of the optical axis of the lens system, but the third lens group is fixedly disposed between the second lens group and the on-chip micro-lens equipped solid-state imaging device.. The lens system further includes an aperture stop fixedly disposed between the first lens group and the second lens group where the subject focal point of the third lens group is positioned.

When the first lens group is in the optical axis, and the second lens group is out of the optical axis, the lens system provides a long focal length or a telephoto angle of view. When the second lens group is in the optical axis, and the first lens group is out of the optical axis, the lens system provides a short focal length or a wide angle of view.

Since the third lens group is arranged so as to place its object focal point near the aperture stop without regard to the focal length of the lens system, the lens system always directs light rays substantially parallel with its optical axis toward the on-chip micro-lens equipped solid-state imaging device.

BRIEF DESCRIPTION OF THE DRAWINGS

The above and other objects and features of the present invention will be clearly understood from the following detailed description with respect to preferred embodiments thereof when considered in conjunction with the accompanying drawings, in which:

FIG. 4A is a diagrammatic side view of a prior art focal length changeable lens which is at a telephoto angle of view or changed to a long focal length;

FIG. 4B is a diagrammatic side view of the prior art focal length changeable lens which is at a wide angle of view or changed to a short focal length; and FIG. 5 is a schematic illustration of an on-chip micro-lens equipped solid-state imaging device with which the focal length changeable lens system of the present invention is used for.

DETAILED DESCRIPTION OF THE PREFERRED EMBODIMENT

In the following description and throughout the drawings, the reference L followed by an arabic numeral indicates the lens element progressively from the object end to the image end of the lens system. The reference radius numbers E are the progressive lens surface radii. The reference d followed by an arabic numeral indicates the axial distance between the adjacent lens surfaces progressively from the object end to the image end of the lens system. Positive surface radii are struck from the right of the lens surface on the optical axis, and negative surface radii are struck from the left of the lens surface on the optical axis. $N_d$ is the index of refraction of the lens element for d spectrum, and $V_d$ is the dispersion of the lens element for d spectrum as measured by the Abbe number. $F_L$ and $F_S$ indicate the long focal or telephoto angle of view length and short focal length or wide angle of view of the lens system, respectively. $F_{3L}$ and $F_{3S}$ indicate the focal length of the third lens group IIIA on the image end and the object end, respectively. D is the distance between the aperture stop 1A and the foremost lens element of the third lens group IIIA. $AM_L$ and $AM_S$ indicate the maximum angle of the principal light ray incident upon the margin of the solid-state imaging element for the long focal length and the short focal length of the lens system, respectively.

Figure 1:
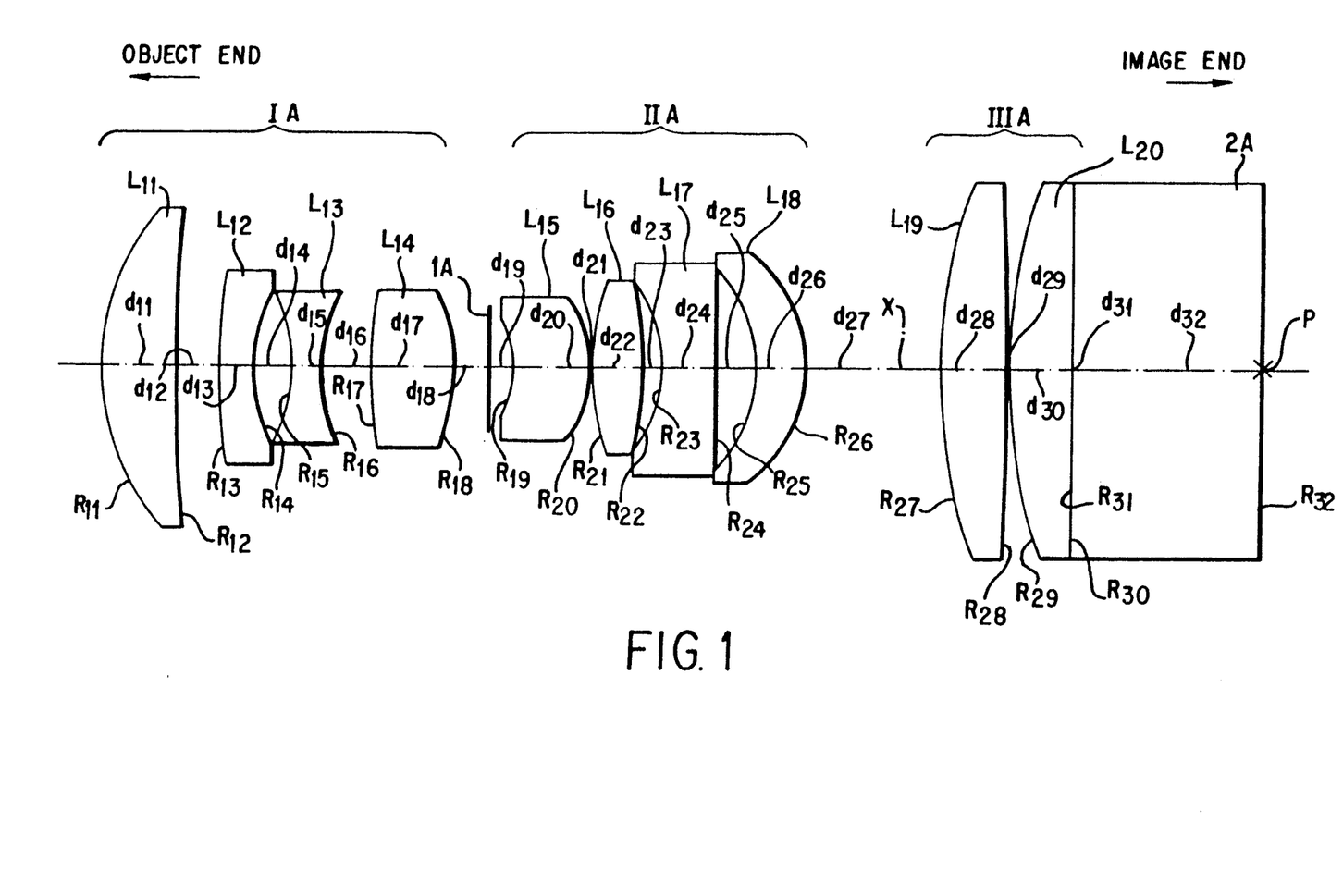
FIG. 1 is a diagrammatic side view of a focal length changeable lens with its exit pupil located at a long distance in accordance with a preferred embodiment of the present invention.
Figure 2A:
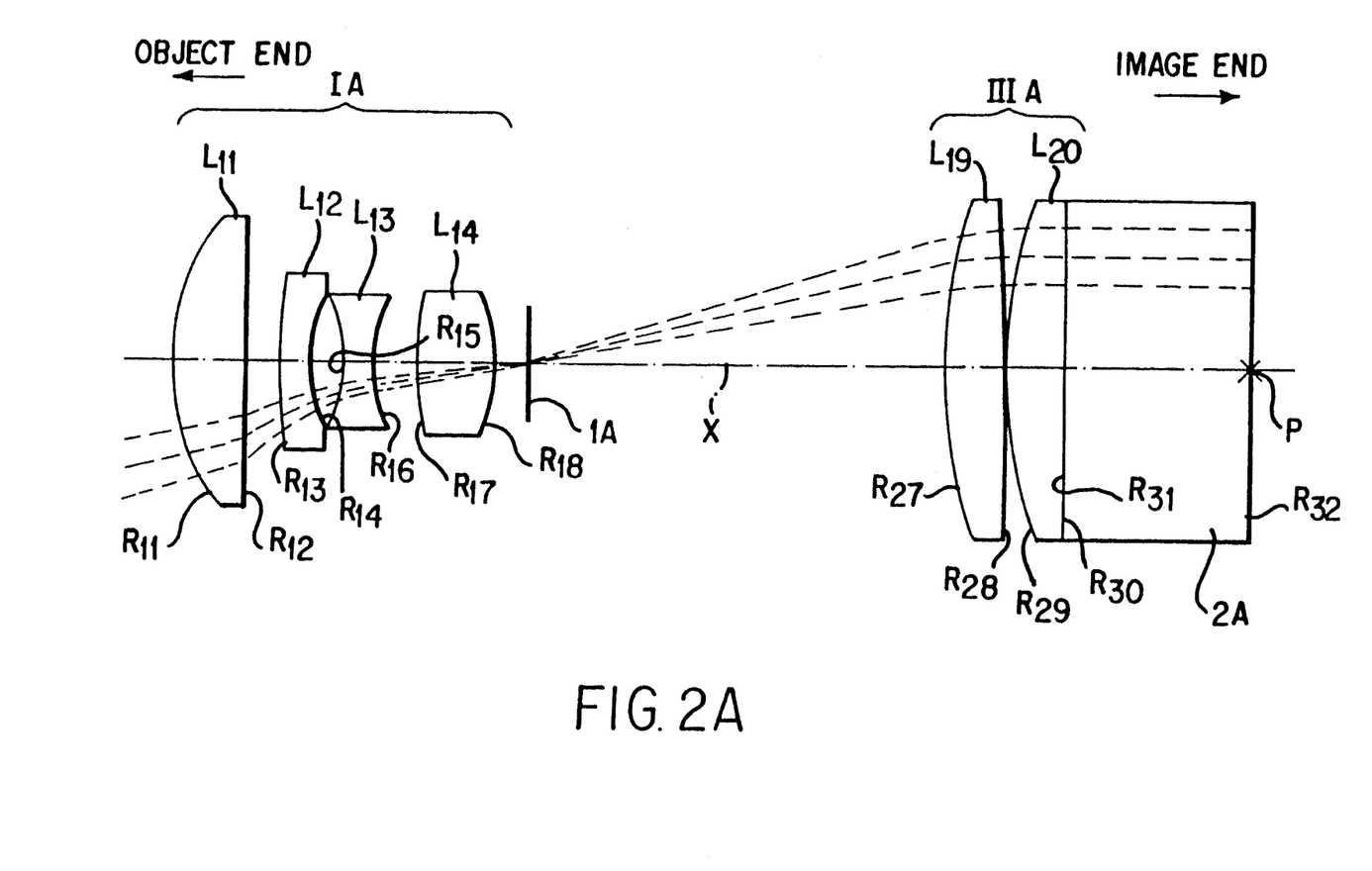
FIG. 2A is a diagrammatic side view of the focal length changeable lens of FIG. 1 which is at a telephoto angle of view or changed to a long focal length.
Figure 2B:
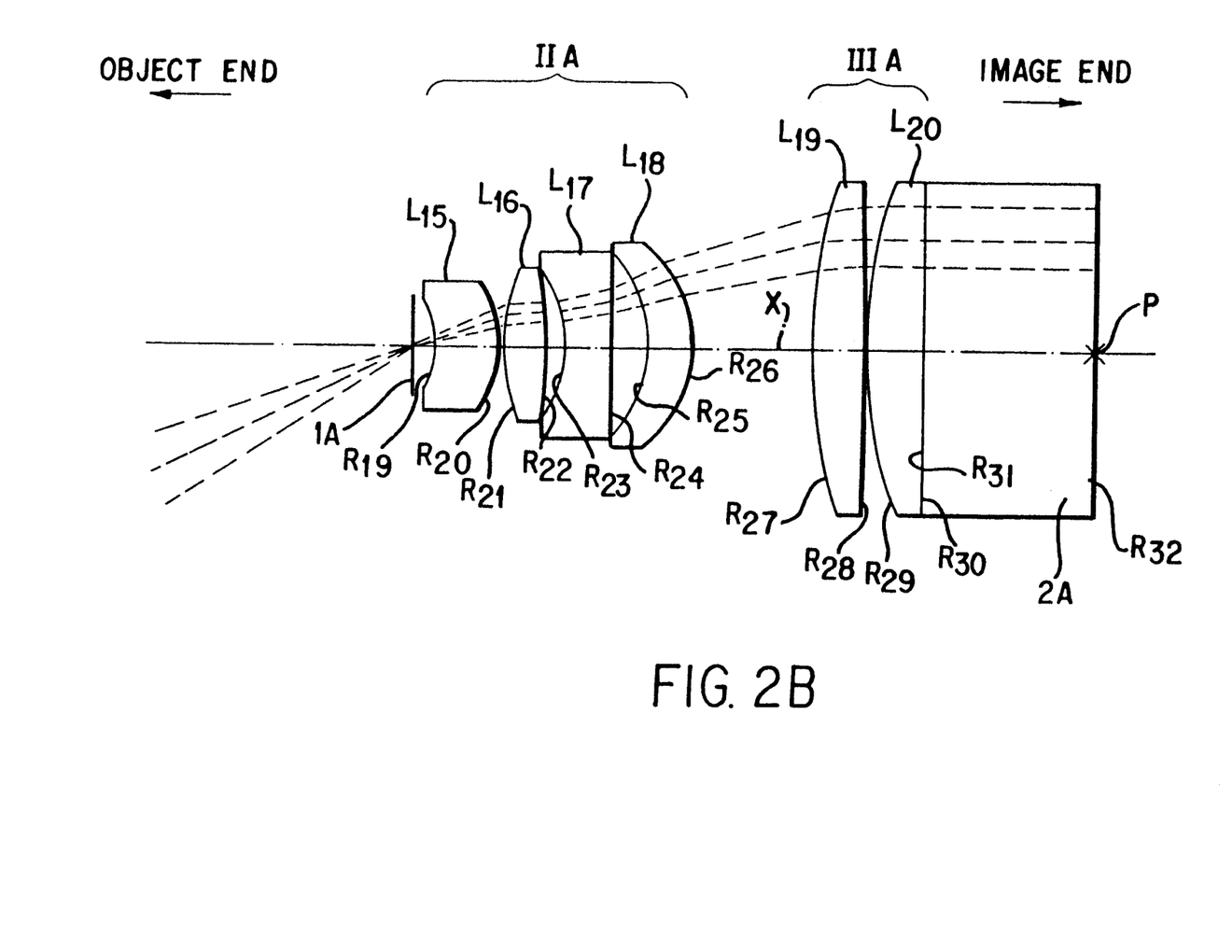
FIG. 2B is a diagrammatic side view of the focal length changeable lens of FIG. 1 which is at a wide angle of view or changed to a short focal length.

Referring to the drawings in detail, and in particular, to FIGS. 1 and 2A and 2B, a focal length changeable lens system (which is hereafter referred to as a lens system for simplicity) having its exit pupil at a long distance in accordance with a preferred embodiment of the present invention is shown, which is used with and positioned in front of a still video camera with an on-chip micro-lens equipped solid-state imaging device, such as one shown in FIG. 5. The lens system includes three lens groups of lens elements, namely a first lens group IA, a second lens group IIA and a third lens group IIIA arranged in order from the object end. On the image end behind the lens system, there is a parallel optical block 2A functioning as an optical filter, such as a low-pass filter and an infrared cut filter, which forms part of an optical system of a solid-state imaging device of the still video camera. The parallel optical block 2A is positional fixed in the optical axis X with one flat surface, remote from the third lens group IIIA, located coincident with the image plane E of the lens system and another flat surface cemented to the third lens group IIIA. All the first to third lens groups IA to IIIA are aligned with the optical axis X and fixed in axial position relative to one another, and the first and second lens groups IA and IA are independently, selectively movable in and out of the lens system for changing the focal length of the lens system between a long focal length or telephoto angle of view and a short focal length or wide angle of view. The third group III remains fixed in the lens system at all times. The lens system further includes an aperture stop 1A, such as a diaphragm, fixedly positioned between and remaining fixed with respect to the first and second groups IA and IIA. When the second lens group IIA is moved out of the optical axis X and the lens system is comprised of the first and third lens groups IA and IIIA, including the aperture stop 1A, the lens system changes its focal length to the long focal length. On the other hand, when the first lens group IA is replaced with the second lens group IIA with the third lens group IIIA remaining unchanged in position, that is, when the first lens group IA is moved out of the optical axis X and the second lens group IIA is moved into the optical axis X, the lens system changes its focal length to the short focal length.

Specifically describing, the lens system in greater detail, the first lens group IA, having a positive overall power, is composed of four lens elements, namely first, second, third and fourth lens elements $L_{11}$, $L_{12}$, $L_{13}$ and $L_{14}$ arranged in order from the object end. The first lens element $L_{11}$ is a positive meniscus lens convex to the object end, the second lens element $L_{12}$ is a negative meniscus lens convex to the object end, the third lens element $L_{13}$ is a biconcave lens with a concave surface having a smaller radius of curvature on the image end, and the fourth lens element $L_{14}$ is a biconvex lens having a convex surface having a smaller radius of curvature on the image end. The second lens group IIA, having a positive overall power, is composed of four lens elements, namely fifth, sixth, seventh and eighth lens elements $L_{15}$, $L_{16}$, $L_{17}$ and $L_{18}$ arranged in order from the object end. The fifth lens element $L_{15}$ is a negative meniscus lens convex to the image end, the sixth lens element $L_{16}$ is a biconvex lens with a convex surface having a smaller radius of curvature on the object end, the seventh lens element $L_{17}$ is a biconcave lens with a concave surface having a smaller radius of curvature on the object end, and the eighth lens element $L_{18}$ is a positive meniscus lens convex to the image end. The third lens group IIIA, having a positive overall power, is composed of two lens elements, namely ninth and tenth lens elements $L_{19}$ and $L_{20}$ arranged in order from the object end. Both ninth and tenth lens elements $L_{19}$ and $L_{20}$ are plano-convex lenses, each being convex to the object end.

The lens system shown in FIGS. 1, and 2A and 2B is specifically described in the following Table I:

TABLE I

| Lens Element | Radius of Curvature (mm.) | Axial Distance Between Surfaces (mm.) | $N_d$ | $V_d$ |
|---|---|---|---|---|
| $L_{11}$ | $R_{11} = 6.800$ | | | |
| | | $d_{11} = 2.00$ | 1.79950 | 42.3 |
| | $R_{12} = 117.519$ | | | |
| | | $d_{12} = 1.04$ | | |
| $L_{12}$ | $R_{13} = 19.914$ | | | |
| | | $d_{13} = 0.90$ | 1.68893 | 31.1 |
| | $R_{14} = 5.341$ | | | |
| | | $d_{14} = 0.80$ | | |
| $L_{13}$ | $R_{15} = -5.501$ | | | |
| | | $d_{15} = 0.90$ | 1.68893 | 31.1 |
| | $R_{16} = 4.170$ | | | |
| | | $d_{16} = 1.20$ | | |
| $L_{14}$ | $R_{17} = 10.707$ | | | |
| | | $d_{17} = 2.23$ | 1.71300 | 53.9 |
| | $R_{18} = -5.166$ | | | |
| | | $d_{18/19} = 1.47$ | | |
| | $R_{19} = -2.938$ | | | |
| $L_{15}$ | | $d_{20} = 2.00$ | 1.77250 | 49.6 |
| | $R_{20} = -3.276$ | | | |
| | | $d_{21} = 0.10$ | | |
| | $R_{21} = 7.123$ | | | |
| $L_{16}$ | | $d_{22} = 1.25$ | 1.77250 | 49.6 |
| | $R_{22} = -10.785$ | | | |
| | | $d_{23} = 0.45$ | | |
| | $R_{23} = -4.359$ | | | |
| $L_{17}$ | | $d_{24} = 1.50$ | 1.84666 | 23.8 |
| | $R_{24} = 234.195$ | | | |
| | | $d_{25} = 1.05$ | | |
| | $R_{25} = -4.141$ | | | |
| $L_{18}$ | | $d_{26} = 1.25$ | 1.77250 | 49.6 |
| | $R_{26} = -3.926$ | | | |
| | | $d_{27} = 3.56$ | | |
| | $R_{27} = 15.550$ | | | |
| $L_{19}$ | | $d_{28} = 1.60$ | 1.62041 | 60.3 |
| | $R_{28} = Infinity$ | | | |
| | | $d_{29} = 0.10$ | | |
| | $R_{29} = 15.550$ | | | |
| $L_{20}$ | | $d_{30} = 1.60$ | 1.62041 | 60.3 |
| | $R_{30} = Infinity$ | | | |
| | | $d_{31} = 0.00$ | | |
| | $R_{31} = Infinity$ | | | |
| 2A | | $d_{32} = 5.00$ | 1.51633 | 64.1 |
| | $R_{32} = Infinity$ | | | |

The particulars of the lens system described in Table I are specified as shown in the following Table I-A:

TABLE I-A

| $F_L$ | $F_S$ | $F_I$ | $F_F$ | D | $AM_L$ | $AM_S$ |
|---|---|---|---|---|---|---|
| 14.00 mm. | 7.31 mm. | 19.37 mm. | 12.21 mm. | 11.70 mm. | 2 25' | 3 24' |

According to the above embodiment, in spite of the focal length of the lens system, the object focal point of the third lens group IIIA is near or at the aperture stop 1A, and consequently, light rays, exiting from the aperture stop 1A and being incident upon the third lens group IIIA, travel almost parallel with the optical axis X after passing through the third lens group IIIA. Hence, the light rays entering into the respective microlens elements 104 of the solid-state imaging device, see FIG. 5, are substantially in parallel with the optical axis X. As a result, almost all of the light rays incident upon each microlens element 104 are directed to the photosensitive areas of each solid-state imaging element defined by the aperture 103.

Figure 3A:
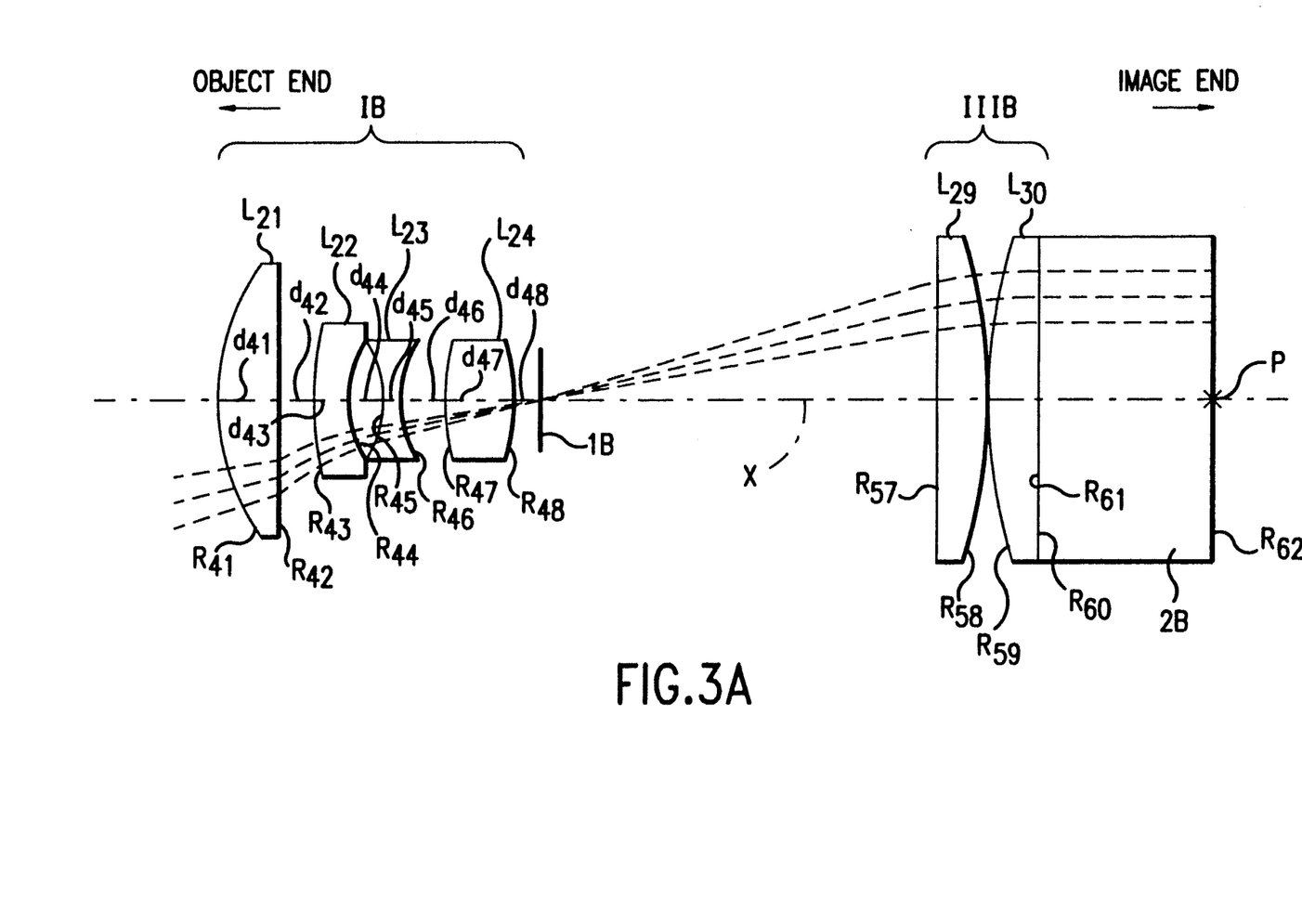
FIG. 3A is a diagrammatic side view of a focal length changeable lens with its exit pupil located at a long distance in accordance with another preferred embodiment of the present invention which is at a telephoto angle of view or changed to a long focal length.
Figure 3B:
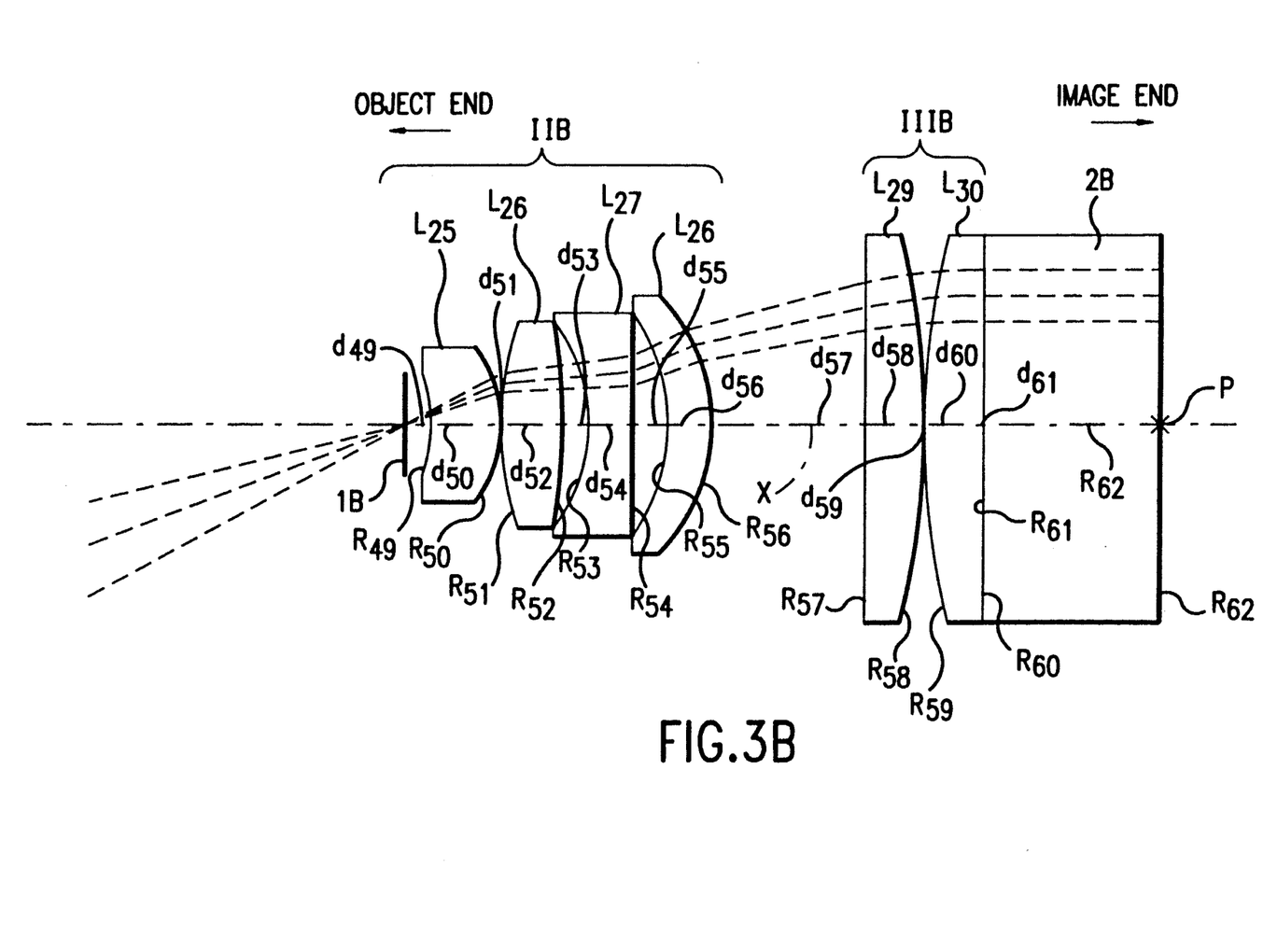
FIG. 3B is a diagrammatic side view of the focal length changeable lens which is at a wide angle of view or changed to a short focal length.

Referring to FIGS. 3A and 3B, a lens system in accordance with another preferred embodiment of the present invention is shown, which includes first, second and third groups of lens elements IB, IIB and IIIB arranged in order from the object end. A parallel optical block 2B, functioning as an optical filter, is placed on the image end behind the lens system. The first and second lens groups IIB and IIIB are independently, selectively movable in and out of the lens system for changing the focal length of the lens system between a long focal length or telephoto angle of view and a short focal length or wide angle of view. The third group IIIB remains fixed in the lens system at all times. The lens system further includes an aperture stop 1B positioned between, and remaining fixed with respect to, the first and second groups IB and IIB. When the second lens group IIB is moved out of the optical axis X and the lens system is comprised of the first and third lens groups IB and IIIB, the lens system changes its focal length to the long focal length. On the other hand, when the first lens group IB is replaced with the second lens group IIB with the third lens group IIIA remaining unchanged in position, the lens system changes its focal length to the short focal length.

The first lens group IB is composed of four lens elements, namely first, second, third and fourth lens elements $L_{21}$, $L_{22}$, $L_{23}$ and $L_{24}$ arranged in order from the object end. The first lens element $L_{21}$ is a positive meniscus lens convex to the object end, the second lens element $L_{22}$ is a negative meniscus lens convex to the object end, the third lens element $L_{23}$ is a biconcave lens with the concave surface having a smaller radius of curvature on the image end, and the fourth lens element $L_{24}$ is a biconvex lens with the convex surface having a smaller radius of curvature on the image end. The second lens group IIA is composed of four lens elements, namely fifth, sixth, seventh and eighth lens elements $L_{25}$, $L_{26}$, $L_{27}$ and $L_{28}$ arranged in order from the object end. The fifth lens element $L_{25}$ is a negative meniscus lens convex to the image end, the sixth lens element $L_{26}$ is a biconvex lens with the convex surface having a smaller radius of curvature on the image end, the seventh lens element $L_{27}$ is a negative meniscus convex to the object end, and the eight lens element $L_{28}$ is a positive meniscus lens convex to the image end. The third lens group IIIA is composed of two lens elements, namely ninth and tenth lens elements $L_{29}$ and $L_{30}$ arranged in order from the object end. The ninth lens element $L_{29}$ is a plano-convex lenses convex to the image end, and the tenth lens element $L_{30}$ is a plano-convex lenses convex to the object end.

The lens system shown in FIGS. 3A and 3B is specifically described in the following Table II:

TABLE II

| Lens Element | Radius of Curvature (mm.) | Axial Distance Between Surfaces (mm.) | $N_d$ | $V_d$ |
|---|---|---|---|---|
| $L_{21}$ | $R_{41} = 6.998$ | | | |
| | | $d_{41} = 2.00$ | 1.79950 | 42.3 |
| | $R_{42} = 61.139$ | | | |
| | | $d_{42} = 1.29$ | | |
| $L_{22}$ | $R_{43} = 18.431$ | | | |
| | | $d_{43} = 0.90$ | 1.68893 | 31.1 |
| | $R_{44} = 5.687$ | | | |
| | | $d_{44} = 0.72$ | | |
| $L_{23}$ | $R_{45} = -5.724$ | | | |
| | | $d_{45} = 0.90$ | 1.68893 | 31.1 |
| | $R_{46} = 4.154$ | | | |
| | | $d_{46} = 1.10$ | | |
| | $R_{47} = 11.435$ | | | |
| $L_{24}$ | | $d_{47} = 2.55$ | 1.71300 | 53.9 |

TABLE II-continued

| Lens Element | Radius of Curvature (mm.) | Axial Distance Between Surfaces (mm.) | $N_d$ | $V_d$ |
|---|---|---|---|---|
| | $R_{48} = -4.980$ | | | |
| | | $d_{48/49} = 1.15$ | | |
| | $R_{49} = -2.772$ | | | |
| $L_{25}$ | | $d_{50} = 1.80$ | 1.77250 | 49.6 |
| | $R_{50} = -3.178$ | | | |
| | | $d_{51} = 0.10$ | | |
| | $R_{51} = 8.319$ | | | |
| $L_{26}$ | | $d_{52} = 1.15$ | 1.69680 | 55.6 |
| | $R_{52} = -7.845$ | | | |
| | | $d_{53} = 0.57$ | | |
| | $R_{53} = -3.668$ | | | |
| $L_{27}$ | | $d_{54} = 1.30$ | 1.80518 | 25.5 |
| | $R_{54} = -23.359$ | | | |
| | | $d_{55} = 0.65$ | | |
| | $R_{55} = -4.429$ | | | |
| $L_{28}$ | | $d_{56} = 1.25$ | 1.77250 | 49.6 |
| | $R_{56} = -3.954$ | | | |
| | | $d_{57} = 4.04$ | | |
| | $R_{27} = $ Infinity | | | |
| $L_{29}$ | | $d_{58} = 1.60$ | 1.62041 | 60.3 |
| | $R_{58} = -15.550$ | | | |
| | | $d_{59} = 0.10$ | | |
| | $R_{59} = 15.550$ | | | |
| $L_{30}$ | | $d_{60} = 1.60$ | 1.62041 | 60.3 |
| | $R_{60} = $ Infinity | | | |
| | | $d_{61} = 0.00$ | | |
| | $R_{61} = $ Infinity | | | |
| 2B | | $d_{62} = 5.00$ | 1.51633 | 64.1 |
| | $R_{62} = $ Infinity | | | |

The particulars of the lens system described in Table II are specified as shown in the following Table II-A:

TABLE II-A

| $F_L$ | $F_S$ | $F_I$ | $F_F$ | D | $AM_L$ | $AM_S$ |
|---|---|---|---|---|---|---|
| 13.00 mm. | 7.25 mm. | 18.99 mm. | 11.47 mm. | 11.70 mm. | 1 37' | 3 04' |

Reference is now made to FIGS. 4A and 4B for the purpose of providing a description of a prior art focal length changeable lens which will enhance an understanding of the effect of the lens system shown in FIGS. 1 through 3A and 3B.

The prior art focal length changeable lens system, for use with a still video camera with an on-chip micro-lens equipped solid-state imaging device, includes two lens groups of lens elements, namely a first lens group IC and a second lens group IIC. On the image end behind the lens system, there is a parallel optical block 2C functioning as an optical filter, forming part of an optical system of a solid-state imaging device of the still video camera. The first and second lens groups IC to IIC are aligned with the optical axis X and fixed in axial position relative to each other and are independently, selectively movable in and out of the lens system for changing the focal length of the lens system between a long focal length or telephoto angle of view and a short focal length or wide angle of view. The lens system also includes an aperture stop 1C fixedly positioned between and remaining fixed with respect to the first and second groups IA and IIA. When the second lens group IIA is moved out of the optical axis X and the lens system is comprised of the first lens group IA, the lens system changes its focal length to the long focal length. On the other hand, when the first lens group IC is moved out of the optical axis X and the second lens group IIC is moved into the optical axis X, the lens system changes its focal length to the short focal length.

The first lens group IC is composed of four lens elements, namely first, second, third and fourth lens elements $L_{31}$, $L_{32}$, $L_{33}$ and $L_{34}$ arranged in order from the object end. The first lens element $L_{31}$ is a negative meniscus lens convex to the object end, the second lens element $L_{32}$ is a biconvex lens with the convex surface having a smaller radius of curvature on the object end, the third lens element $L_{33}$ is a biconcave lens with the concave surface having a smaller radius of curvature on the image end, and the fourth lens element $L_{34}$ is a biconvex lens with the convex surface having a smaller radius of curvature on the image end. The second lens group IIC is composed of four lens elements, namely fifth, sixth, seventh and eighth lens elements $L_{35}$, $L_{36}$, $L_{37}$ and $L_{38}$ arranged in order from the object end. Both the fifth and seventh lens elements $L_{35}$ and $L_{37}$ are negative meniscus lenses, each being convex to the image end, the sixth lens element $L_{36}$ is a positive meniscus lens with the convex surface having a smaller radius of curvature on the image end, and the eighth lens element $L_{38}$ is a biconvex lens with the smaller radius of curvature on the image end.

The prior art focal length changeable lens system shown in FIGS. 4A and 4B is specifically described in the following Table III:

TABLE III

| Lens Element | Radius of Curvature (mm.) | Axial Distance Between Surfaces (mm.) | $N_d$ | $V_d$ |
|---|---|---|---|---|
| | $R_{71} = 98.816$ | | | |
| $L_{31}$ | | $d_{71} = 0.71$ | 1.79950 | 42.3 |
| | $R_{72} = 20.689$ | | | |
| | | $d_{72} = 1.89$ | | |
| | $R_{73} = 14.086$ | | | |
| $L_{32}$ | | $d_{73} = 0.90$ | 1.68893 | 31.1 |
| | $R_{74} = -21.801$ | | | |
| | | $d_{74} = 0.48$ | | |
| | $R_{75} = -6.424$ | | | |
| $L_{33}$ | | $d_{75} = 0.90$ | 1.68893 | 31.1 |
| | $R_{76} = 6.220$ | | | |
| | | $d_{76} = 1.12$ | | |
| | $R_{77} = 15.753$ | | | |
| $L_{34}$ | | $d_{77} = 3.00$ | 1.71300 | 53.9 |
| | $R_{78} = -6.343$ | | | |
| | | $d_{78/79} = 1.54$ | | |
| | $R_{79} = -3.994$ | | | |
| $L_{35}$ | | $d_{80} = 1.80$ | 1.77250 | 49.6 |
| | $R_{80} = -9.347$ | | | |
| | | $d_{81} = 0.40$ | | |
| | $R_{81} = -11.112$ | | | |
| $L_{36}$ | | $d_{82} = 1.45$ | 1.69680 | 55.6 |
| | $R_{82} = -3.292$ | | | |
| | | $d_{83} = 0.20$ | | |
| | $R_{83} = -3.084$ | | | |
| $L_{37}$ | | $d_{84} = 1.30$ | 1.80518 | 25.5 |
| | $R_{84} = -5.926$ | | | |
| | | $d_{85} = 0.10$ | | |
| | $R_{85} = 19.678$ | | | |
| $L_{38}$ | | $d_{86} = 1.26$ | 1.77250 | 49.6 |
| | $R_{86} = -11.552$ | | | |
| | | $d_{87} = 7.95$ | | |
| | $R_{87} = $ Infinity | | | |
| 2C | | $d_{89} = 5.00$ | 1.51633 | 64.1 |
| | $R_{88} = $ Infinity | | | |

The particulars of the lens system described in Table III are specified as shown in the following Table III-A:

TABLE III-A

| $F_L$ | $F_S$ | $AM_L$ | $AM_S$ |
|---|---|---|---|
| 14.05 mm. | 7.44 mm. | −1 37' | −3 04' |

As apparent from the comparison with the prior art focal length changeable lens shown in FIGS. 4A and 4B, the lens system of the present invention has the maximum angle of the principal light ray incident upon the margin of the solid-state imaging element, both for the long focal length and for the short focal length of the lens system, considerably smaller than that of the prior art focal length changeable lens.

It is to be understood that in place of installing the parallel optical block(s) 2A or 2B disposed in front of the solid-state imaging device of the still video camera, the third lens group IIIA or IIIB may be directly disposed in front of the solid-state imaging device of the still video camera without using such a filter.

It is to be understood that although the present invention has been described in detail with respect to preferred embodiments, various other embodiments and variants may occur to those skilled in the art by following the teachings herein. For example, the radius of curvature of a surface of each lens element can be changed with the same result as the above-described embodiments. Further, the focal length changeable lens may be used with other image forming optical instruments as well as still video cameras having on-chip micro-lens equipped solid-state imaging devices. Such other embodiments and variants fall within the scope and spirit of the invention and are intended to be covered by the following claims.

What is claimed is:

1. A focal length changeable lens system with its exit pupil located at a long distance for use with an on-chip micro-lens equipped solid-state imaging device, whose focal length is changeable between a long focal length and a short focal length, said lens system comprising:
   a first lens group having a positive power, said first lens group being movable into an optical axis of the lens system for the long focal length and out of the optical axis for the short focal length;
   a second lens group having a positive power and disposed on the image end of the lens system relative to said first lens group, said second lens group being movable into the optical axis for the short focal length and out of the optical axis for the long focal length;
   an aperture stop fixedly disposed in the optical axis between said first lens group and said second lens group; and
   a third lens group having a positive power, said third lens group being fixedly disposed between said second lens group and the on-chip micro-lens equipped solid-state imaging device in the optical axis so as to place its object focal point near said aperture stop.

2. A lens system as defined in claim 1, and further comprising a parallel optical element disposed on the side of said third lens group remote from said second lens group and cemented to said third lens group.

3. A lens system as defined in claim 2, wherein said parallel optical element comprises a low-pass filter.

4. A lens system as defined in claim 2, wherein said parallel optical element comprises an infrared cut filter.

5. A lens system as defined in claim 1, and further including a parallel optical filter element (2A), said lens system being comprised of lens elements $L_{11}$–$L_{14}$ for said first lens group, lens elements $L_{15}$–$L_{18}$ for said second lens group and lens elements $L_{19}$ and $L_{20}$ for said third lens group substantially as defined in the following table:

| Lens Element | Radius of Curvature (mm.) | Axial Distance Between Surfaces (mm.) | $N_d$ | $V_d$ |
|---|---|---|---|---|
| $L_{11}$ | $R_{11}$ = 6.800 | $d_{11}$ = 2.00 | 1.79950 | 42.3 |
|  | $R_{12}$ = 117.519 | $d_{12}$ = 1.04 |  |  |
| $L_{12}$ | $R_{13}$ = 19.914 | $d_{13}$ = 0.90 | 1.68893 | 31.1 |
|  | $R_{14}$ = 5.341 | $d_{14}$ = 0.80 |  |  |
| $L_{13}$ | $R_{15}$ = −5.501 | $d_{15}$ = 0.90 | 1.68893 | 31.1 |
|  | $R_{16}$ = 4.170 | $d_{16}$ = 1.20 |  |  |
| $L_{14}$ | $R_{17}$ = 10.707 | $d_{17}$ = 2.23 | 1.71300 | 53.9 |
|  | $R_{18}$ = −5.166 | $d_{18/19}$ = 1.47 |  |  |
| $L_{15}$ | $R_{19}$ = −2.938 | $d_{20}$ = 2.00 | 1.77250 | 49.6 |
|  | $R_{20}$ = −3.276 | $d_{21}$ = 0.10 |  |  |
| $L_{16}$ | $R_{21}$ = 7.123 | $d_{22}$ = 1.25 | 1.77250 | 49.6 |
|  | $R_{22}$ = −10.785 | $d_{23}$ = 0.45 |  |  |
| $L_{17}$ | $R_{23}$ = −4.359 | $d_{24}$ = 1.50 | 1.84666 | 23.8 |
|  | $R_{24}$ = 234.195 | $d_{25}$ = 1.05 |  |  |
| $L_{18}$ | $R_{25}$ = −4.141 | $d_{26}$ = 1.25 | 1.77250 | 49.6 |
|  | $R_{26}$ = −3.926 | $d_{27}$ = 3.56 |  |  |
| $L_{19}$ | $R_{27}$ = 15.550 | $d_{28}$ = 1.60 | 1.62041 | 60.3 |
|  | $R_{28}$ = Infinity | $d_{29}$ = 0.10 |  |  |
| $L_{20}$ | $R_{29}$ = 15.550 | $d_{30}$ = 1.60 | 1.62041 | 60.3 |
|  | $R_{30}$ = Infinity | $d_{31}$ = 0.00 |  |  |
| 2A | $R_{31}$ = Infinity | $d_{32}$ = 5.00 | 1.51633 | 64.1 |
|  | $R_{32}$ = *Infinity* |  |  |  | where the lens elements $L_{11}$ to $L_{20}$ and the parallel optical element (2A) have surfaces $R_{11}$ to $R_{32}$, the axial distance between adjacent surfaces being given by $d_{11}$ to $d_{32}$, the index of refraction being given by $N_d$, and the dispersion measured by the Abbe No. as given by $V_d$.

6. A lens system as defined in claim 1, and further including a parallel optical filter element (2B), said lens system being comprised of lens elements $L_{21}$–$L_{24}$ for said first lens group, lens elements $L_{25}$–$L_{28}$ for said second lens group and lens elements $L_{29}$ and $L_{30}$ for said third lens group substantially as defined in the following table:

| Lens Element | Radius of Curvature (mm.) | Axial Distance Between Surfaces (mm.) | $N_d$ | $V_d$ |
|---|---|---|---|---|
| $L_{21}$ | $R_{41}$ = 6.998 | $d_{41}$ = 2.00 | 1.79950 | 42.3 |
|  | $R_{42}$ = 61.139 | $d_{42}$ = 1.29 |  |  |
| $L_{22}$ | $R_{43}$ = 18.431 | $d_{43}$ = 0.90 | 1.68893 | 31.1 |
|  | $R_{44}$ = 5.687 | $d_{44}$ = 0.72 |  |  |
| $L_{23}$ | $R_{45}$ = −5.724 | $d_{45}$ = 0.90 | 1.68893 | 31.1 |
|  | $R_{46}$ = 4.154 | $d_{46}$ = 1.10 |  |  |

-continued

| Lens Element | Radius of Curvature (mm.) | Axial Distance Between Surfaces (mm.) | $N_d$ | $V_d$ |
|---|---|---|---|---|
| | $R_{47} = 11.435$ | | | |
| $L_{24}$ | | $d_{47} = 2.55$ | 1.71300 | 53.9 |
| | $R_{48} = -4.980$ | | | |
| | | $d_{48/49} = 1.15$ | | |
| | $R_{49} = -2.772$ | | | |
| $L_{25}$ | | $d_{50} = 1.80$ | 1.77250 | 49.6 |
| | $R_{50} = -3.178$ | | | |
| | | $d_{51} = 0.10$ | | |
| | $R_{51} = 8.319$ | | | |
| $L_{26}$ | | $d_{52} = 1.15$ | 1.69680 | 55.6 |
| | $R_{52} = -7.845$ | | | |
| | | $d_{53} = 0.57$ | | |
| | $R_{53} = -3.668$ | | | |
| $L_{27}$ | | $d_{54} = 1.30$ | 1.80518 | 25.5 |
| | $R_{54} = -23.359$ | | | |
| | | $d_{55} = 0.65$ | | |
| | $R_{55} = -4.429$ | | | |

-continued

| Lens Element | Radius of Curvature (mm.) | Axial Distance Between Surfaces (mm.) | $N_d$ | $V_d$ |
|---|---|---|---|---|
| $L_{28}$ | | $d_{56} = 1.25$ | 1.77250 | 49.6 |
| | $R_{56} = -3.954$ | | | |
| | | $d_{57} = 4.04$ | | |
| | $R_{57} = $ Infinity | | | |
| $L_{29}$ | | $d_{58} = 1.60$ | 1.62041 | 60.3 |
| | $R_{58} = -15.550$ | | | |
| | | $d_{59} = 0.10$ | | |
| | $R_{59} = 15.550$ | | | |
| $L_{30}$ | | $d_{60} = 1.60$ | 1.62041 | 60.3 |
| | $R_{60} = $ Infinity | | | |
| | | $d_{61} = 0.00$ | | |
| | $R_{61} = $ Infinity | | | |
| 2B | | $d_{62} = 5.00$ | 1.51633 | 64.1 |
| | $R_{62} = $ Infinity | | | | where the lens elements $L_{21}$ to $L_{30}$ and the parallel optical element (2B) have surfaces $R_{41}$ to $R_{62}$, the axial distance between adjacent surfaces being given by $d_{41}$ to $d_{62}$, the index of refraction being given by $N_d$, and the dispersion measured by the Abbe No. as given by $V_d$.

* * * * *